Feb. 28, 1956    B. COOPER    2,736,630
TOLL CHECKING SYSTEM
Filed Oct. 29, 1952    3 Sheets-Sheet 1
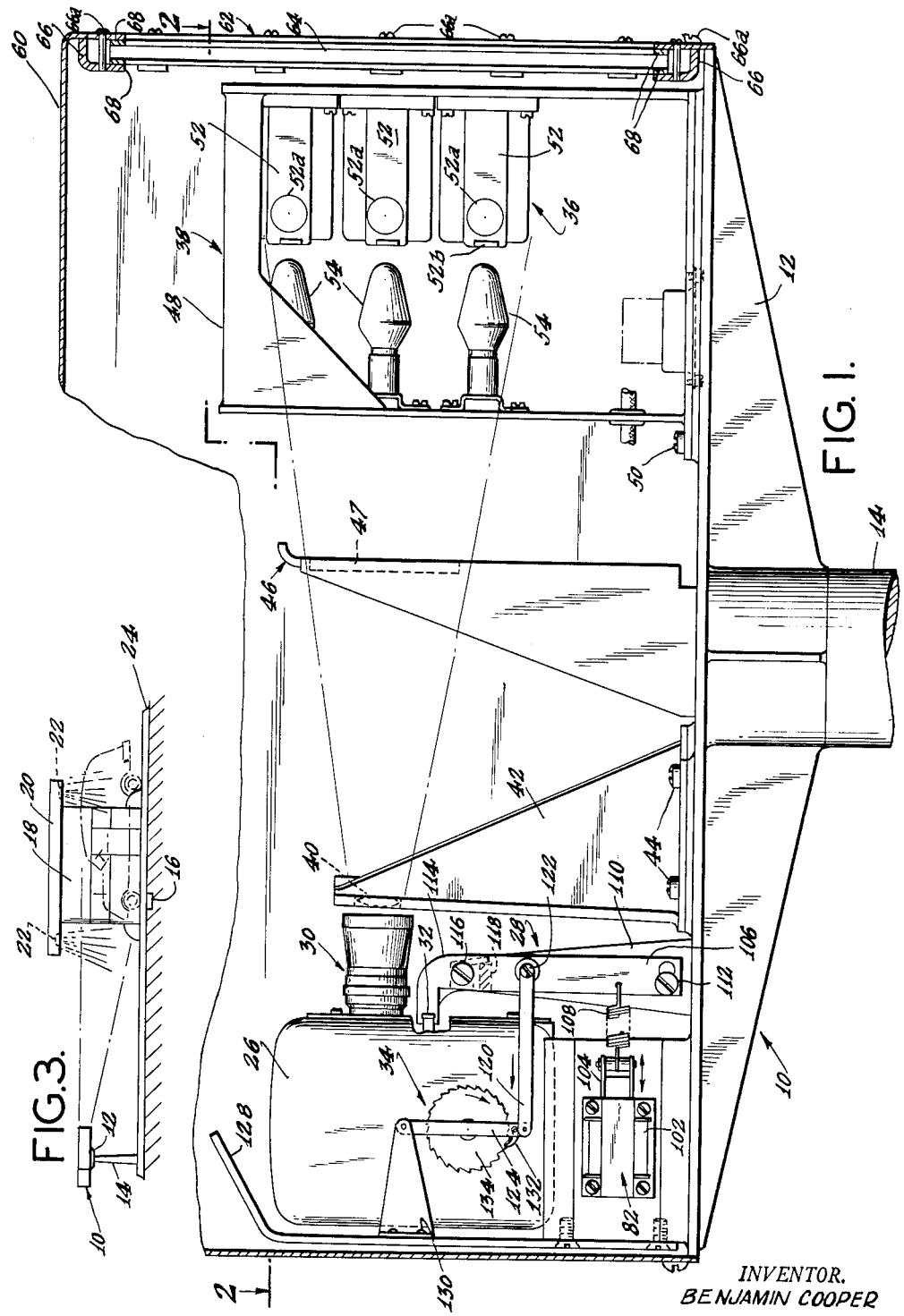
INVENTOR.
BENJAMIN COOPER
BY
J. B. Felshin
ATTORNEY.

Feb. 28, 1956  B. COOPER  2,736,630
TOLL CHECKING SYSTEM
Filed Oct. 29, 1952  3 Sheets-Sheet 2
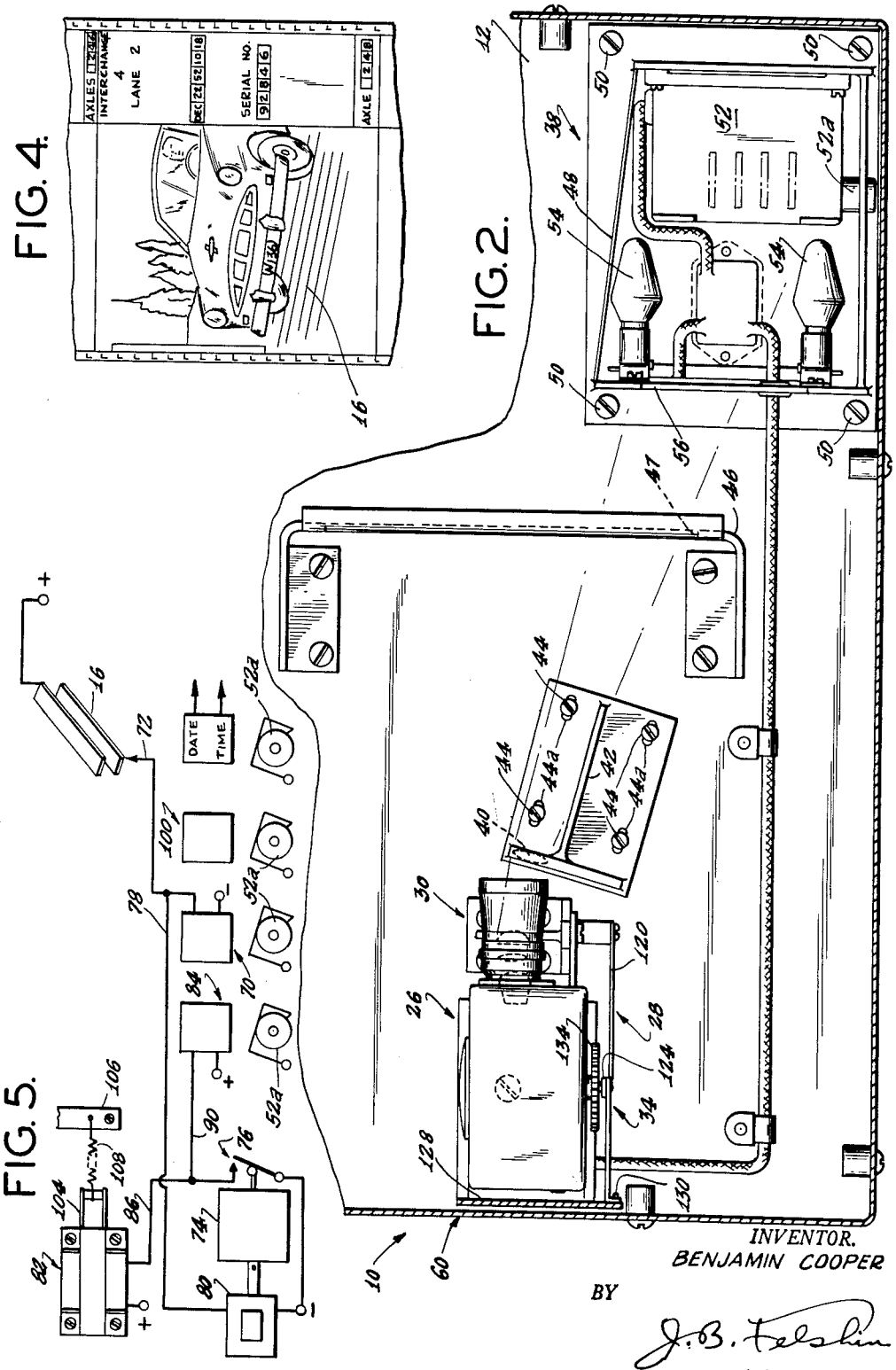
INVENTOR.
BENJAMIN COOPER
BY
J. B. Felshin
ATTORNEY.

Feb. 28, 1956  B. COOPER  2,736,630
TOLL CHECKING SYSTEM
Filed Oct. 29, 1952  3 Sheets—Sheet 3

INVENTOR.
BENJAMIN COOPER
BY
ATTORNEY.

United States Patent Office 2,736,630
Patented Feb. 28, 1956

2,736,630

TOLL CHECKING SYSTEM

Benjamin Cooper, Brooklyn, N. Y., assignor to Research Electronics & Devices Co., Inc., Bayonne, N. J., a corporation of New Jersey Application October 29, 1952, Serial No. 317,468

8 Claims. (Cl. 346—107)

This invention relates generally to toll checking systems and in particular to a system for photographically recording vehicles paying tolls and data relative to the payment of said tolls.

With the establishment of the super type highway or turnpike, the collection of tolls for passage thereon has become more complex and difficult to record with respect to the prevention of unintentional or intentional fraud. This applies particularly to the type of highway wherein access and departure must be made through toll stations or interchanges. Upon entering the toll facility through one of the interchanges, the vehicle driver is handed a toll rate ticket which identifies the point of entry of the vehicle, along with other pertinent data such as the general classification in which the vehicle falls. The vehicle, upon departing from the toll facility at one of the various other interchanges, surrenders the toll rate ticket and the toll collector receiving the ticket ascertains the toll to be collected from the vehicle driver. This toll may be based on mileage, the type of vehicle, commercial or otherwise, etc., and other basic toll rate systems. With the advent of these new superhighways it is proposed that permit or credit cards be issued to frequent users to facilitate the method of operation and control of the superhighways. The permit or credit cards, of course, would result in a transaction involving no cash and, when dispersed with other transactions involving cash, the present day toll recording equipment would not distinguish therebetween, and would result in the introduction of surreptitious practices.

The present invention provides a means wherein a positive check is constantly maintained of all toll transactions, thereby preventing the introduction of such surreptitious practices.

The invention generally comprises photographic means automatically operable by the passage of a vehicle through a toll installation which records pictorially the vehicle and, in addition, records the toll transaction set up by the toll collector with respect to the passage of said vehicle.

Therefore, one of the principal objects of the invention resides in the provision of means to record pictorially the passage of a vehicle through a toll interchange along with the data pertinent to the collection of tolls appertaining to said vehicle.

Another object resides in the provision of means operable by the passage of the vehicle to automatically actuate said pictorially recording means.

Yet another object of the invention is to provide a toll checking system that is tamperproof and which will prepare an accurate unalterable record of each toll transaction through a toll interchange.

A further object of the invention is to provide means in a toll checking system for comparing the propriety of the toll transaction with the vehicle involved in said toll transaction.

Other ancillary objects will be, in part, hereafter pointed out and will be, in part, hereinafter apparent.

In the drawings:

Figure 1 is a side elevation of the recording device with portions cut away to more fully illustrate the various elements therein.

Figure 2 is a cross section taken along line 2—2 of Figure 1, particularly illustrating the optical relationship of the camera, supplementary lens, and the data indicating counters.

Figure 3 is a side elevation of a typical interchange illustrating the placement of the camera recording device relative to the vehicle and the vehicle actuated treadle.

Figure 4 is a planned view of the processed record illustrating the relationship of the pictorial image and the adjacent data image.

Figure 5 is a simple schematic diagram illustrating the operating relationship of the various elements of the system.

Figure 6:
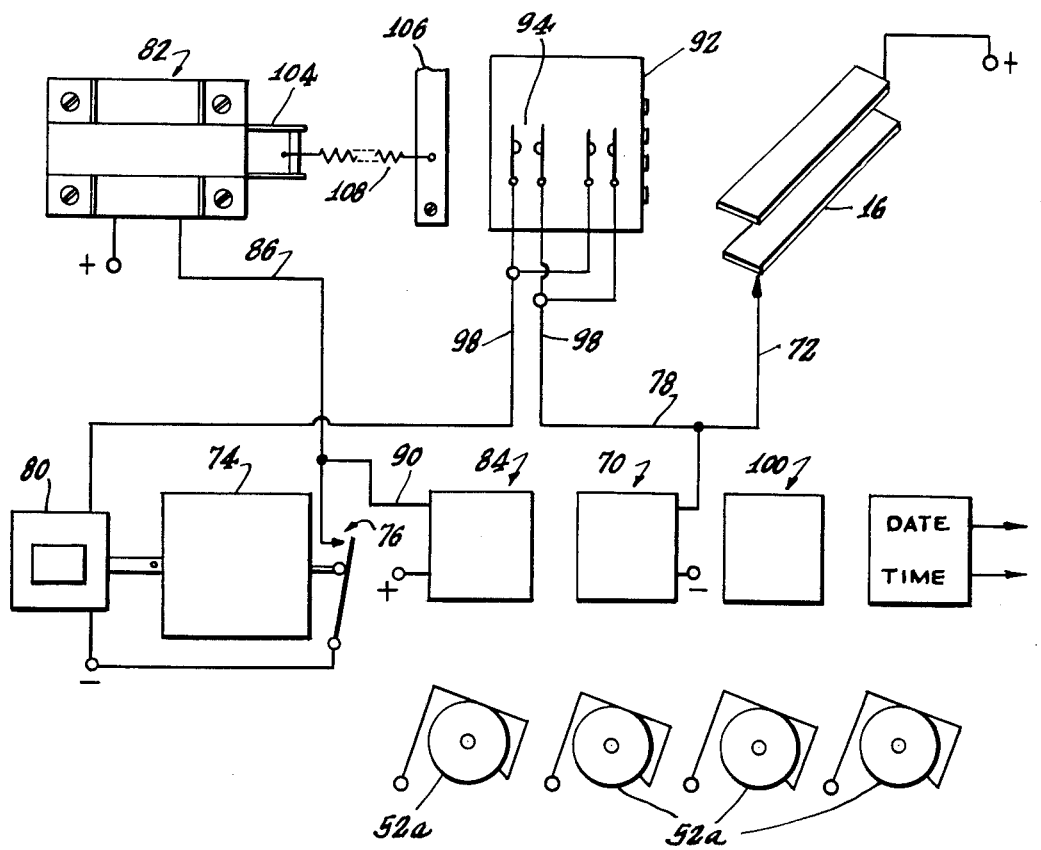
Figure 6 is a simple schematic diagram illustrating another embodiment of the invention wherein the push buttons of a key box control the photographic recording means.

Referring to the drawings in detail, 10 generally designates the camera recording device supported on a bracket 12 mounted on a stanchion 14. The stanchion 14 is disposed a sufficient distance in front of the oncoming vehicular traffic in fixed relation to the interchange, as shown in Figure 3. Each interchange comprises a toll booth 18 having an overhead canopy 20 in which illumination 22 is provided, and is disposed on the highway 24 to provide a single lane through which all vehicles must pass. Imbedded transversely of the lane is a treadle 16 having one or more pairs of normally open contacts therein, not shown. These treadles are conventional and generally comprise an outer flexible rubber casing in which the pairs of lateral spaced contact strips are positioned. The weight of the vehicle rolling over the outer casing effects the closure of one contact strip against the other. Such a treadle is completely disclosed in the Patent 2,251,351 to Cooper issued August 5, 1941, and therefore need not be described in detail herein. Positioned within the toll booth 18 is a typical toll register, not shown, having a plurality of push buttons. Each of the buttons correspond to a vehicle classification and are actuated to record the payment of a predetermined toll. Such a toll register is completely disclosed in the Patent 2,351,405, to Cooper, issued June 13, 1944, and need not be described in detail herein.

The principal element of the invention is the camera recording device 10. This device comprises a camera 26 of the conventional 8 mm. type mounted in fixed relation on the bracket 12 and further provided with an automatic actuating and rewinding mechanism generally designated as 28. The camera is provided with lens assembly 30 and a shutter actuator 32. It is proposed that the camera be of the single frame type wherein actuation of the actuator 32 effects a shutter release and advances the film one frame.

The shutter release mechanism 28 includes a rewinding mechanism 34 which automatically rewinds the conventional spring wound film forwarding mechanism of a camera of this type.

Also provided in the camera recording device are a plurality of electromagnetic counters generally designated as 36 which are mounted within a counter unit 38 and positioned in optical register with the camera 26. Interposed between the lens of the camera and the counter unit 38 is a supplemental lens 40 mounted on a bracket 42, secured as by screws 44, to the mounting bracket 12. Further, there is provided a field limiting plate 46 also mounted on bracket 12 and provided with an aperture 47 therein. Apertured plate 46 is utilized to define the objective field of the camera 26. As shown in Figure 3, the camera unit 10 is directed toward that portion of the vehicular lane adjacent to the toll booth. Therefore, when actuated, a picture is taken of the lane and any vehicle that may be disposed thereon.

The counter unit 38 generally comprises an outer frame 48 that is secured in fixed relation on the plate 12 as by screws 50. Mounted within the unit 38 on the frame 48 are plural counters 52 provided with digit counter wheels 52A, so disposed to be visible through an aperture 52B provided in each counter casing. These counters may be of the type disclosed in the Patent 2,185,724 to Cooper issued January 2, 1940, having an additional casing disposed around the digit wheels and provided with a slot or aperture 52B through which the relative indicia on the digit wheels are exposed in aligned relation. Also mounted on the frame 48, Figures 1 and 2, are plural lamps 54 which provide side illumination of the exposed indicia on the digit counter wheels. It may be said that these counters are of the type wherein an electric impulse effects the advancement of the units digit wheel a single count. Appropriate transfer mechanism interconnect the units digit wheels with the tens, hundreds digit wheels, etc. Since these counters are completely disclosed in the above cited patent, a detailed disclosing thereof is deemed unnecessary.

As shown in Figure 2, the lamps 54 are offset relative to the counters and are concealed from the optical field of the camera lens unit 30. The slots 44A provided in the bracket 42 permit adjustment of the optical registration of the supplemental lens 40. Thus, a portion of the optical field of the camera lens unit 30 is in focussed optical register with the digit wheels 52 of the counters. The casing 48 of unit 38 is provided with a field limiting aperture 56 to expose only those parts of the digit wheels necessary for registration.

Referring to Figure 1 once more, the camera unit is provided with a cover generally designated as 60 which comprises side, front, rear and top walls. The front wall is further provided with an aperture generally shown as 62 which comprises a waterproof transparent window consisting of a glass plate 64 mounted against the front wall of casing 60 and secured by side angle members 66 and screws 66A. Interposed between the glass member 64 and the side wall and the brackets 66, respectively, are gasket members 68 which provide a water-tight seal. The counter unit 38 is offset relative to the glass window 62 so that the optical field of the camera 30 is not interrupted thereby.

The preferred embodiment of the invention resides in a control circuit shown in schematic form in Figure 5 wherein the treadle 16 controls an axle counter 70. As shown, one contact of the treadle 16 is connected to a positive supply of potential, while the other contact is connected by conductor 72 to one terminal of the coil of the electromagnetic counter 70. The other terminal of said coil is connected to a negative source of potential. Thus, closure of the contact strips of treadle 16 supplies a source of electrical potential to the axle counter 70 and results in advancement of the digit wheel one count. This counter is designated the axle counter since each passage of an axle over the treadle actuates the counter mechanism one increment or one count. The treadle 16 further controls a time delay mechanism generally designated as 74 which includes a switch 76. Conductor 72 connects with a conductor 78 which is connected in turn to one terminal of the coil of release solenoid 80. The other terminal of the coil of solenoid 80 is connected to a source of negative potential. Thus, with each actuation of the treadle 16 release solenoid 80 is energized along with the axle counter 70. This time delay mechanism is conventional and is of the mechanical type wherein actuation of solenoid 80 initiates a mechanical cycle that closes switch 76 immediately but retains said switch closed for a delayed period even though solenoid 80 de-energizes. This is to prevent the second axle of the vehicle rolling over the treadle 16 from reactuating the release solenoid 80. The switch 76 controls the camera actuating solenoid 82 as follows: One contact of the switch 76 is connected to a source of negative potential by conductor 84 while the other contact is connected by conductor 86 to one terminal of the coil of solenoid 82. The other terminal of the solenoid 82 is connected to a source of positive potential. Thus, closure of the switch 76 energizes the solenoid 82 for a purpose as will be hereinafter disclosed. Concurrently, with the energizing of solenoid 82 a second circuit is completed by the closure of switch 76 to actuate a serial counter unit 84. A conductor 90 is connected to the normally opened contact of switch 76 and to one terminal of the coil of the electromagnetic counter 84. The other terminal of the coil of the counter 84 is connected to a source of positive potential. Thus, with each energization of the solenoid 82, counter 84 is also energized and its digit wheel advances one unit or one count. Therefore, it will be seen that the first axle or first wheel of the vehicle rolling over the treadle 16 will effect the energization of the axle counter, the camera release solenoid 82 and the serial counter. The delay mechanism 80 is actuated and its switch 76 remains closed for a predetermined period of time sufficient to allow the rear wheels of the vehicle to roll over the treadle without causing the opening and reclosing of the switch 76. The serial counter 84 and the release solenoid 82 thus remain energized for that predetermined period of time. The axle counter 70 remains operative and continues to count each axle.

A second embodiment of the system is also shown in Figure 6 in dotted line, wherein a key box 92 is illustrated. Associated with each of certain keys of the key box 92 are switches 94 connected in parallel relation and interposed in a circuit including the conductor 78. The switches in this embodiment are normally opened, and the conductor 78 is broken and connected to the respective conductors 98 of the circuit of switches 94. In this manner, one of the push buttons associated with the switches 94 would be depressed to complete the circuit from the treadle to the delay mechanism solenoid 80. This may be employed to differentiate between those cars paying a toll and those cars or vehicles utilizing credit or permit privileges. In the latter embodiment, the toll collector would, upon ascertaining the type of transaction, depress the appropriate push button to record on an appropriate counter indicated as 100, the particular classification of the vehicle. While counter 100 is not shown in a circuit with the push buttons, this is obvious from the aforecited patent relating to toll registers. Simultaneously with the recording of the transaction, the circuit would be prepared for the taking of a pictorial record by the camera unit 10 in that the subsequent passage of a vehicle over the treadle 16 would actuate the time delay mechanism 80 in a manner similar to that herebefore described.

As shown in Figure 4, a pictorial record of the vehicle is achieved by the camera 26 and comprises a view of the treadle 16 and the vehicle crossing the treadle. Alongside this picture of the vehicle is the data relative to the particular transaction, that is, the interchange number, and the lane number, if more than one lane were present at the interchange. This information would be fixed in the counter unit 38. The remaining data would comprise the indicia on the digit wheels of the axle counters, indicia on the digit wheels of the serial number counters, and may include indicia representative of the date and time. This date-time information may be provided by similar electromagnetic counters that receive periodic impulses to continuously advance associated digit wheels in timed relation.

Refering back to Figure 1, the camera actuating mechanism will now be described. Solenoid 82 is disposed and secured to the base 12, adjacent to, and beneath the camera 26. The solenoid 82 comprises a body 102 having a plunger 104 that is attracted within the body 102 upon the energization of the solenoid. Interposed between the plunger 104 and a lever 106 is a spring 108. The lever 106 is pivotally mounted to a suitable bracket 110 by means of a screw 112. The bracket 110 is further mounted on the base 12. Thus, energization of the solenoid 82 rotates lever 106 in a clockwise direction as shown in Figure 1. Lever 106 has pivotally secured at its upper end an arm 114, yieldably mounted as by screws 116 to lever 106. Interposed between a depending portion of the arm 114 and the lever 106 is a compression spring 118. Further, the arm 114 is disposed in engagement with plunger or actuator 32 of the camera shutter actuating mechanism. Thus, counter-clockwise movement of the lever 106 yieldably depresses the actuator 32 to release the shutter mechanism and effect the taking of a picture. Concurrently with the release of the actuator 32 the camera rewind mechanism 34 is actuated. This mechanism comprises a link 120 pivotally connected to lever 106 as by screw 122 at one end and pivotally connected by suitable means to a lever 124 at its other end. Lever 124 is part of a ratchet mechanism and is pivotally connected at its other end to a bracket 126 horizontally extending from a vertical bracket 128 and secured thereto as by screws 130. Lever 124 carries thereon a pawl 132 that is yieldably engaged with the teeth of a ratchet wheel 134. Ratchet wheel 134 is affixed to the rewind shaft of the camera rewinding mechanism, not shown. This mechanism is conventional and normally has thereon a handle or the like for manual rewinding. In the present instance, each actuation of the shutter release mechanism 32 effects a rewinding of the film feeding mechanism by means of the ratchet wheel 134. The springs 108 and 118 equalize the differences existing in the stroke for actuating actuator 32 and rotating ratchet wheel 134.

Thus, it will be seen that there has been provided a device that is well suited to meet the conditions of practical use and provide a positive means for checking the passage of vehicles through a toll installation. The pictorial record such as illustrated in Figure 4 may be scrutinized and compared with the deposits handed in by a toll collector at the end of his tour of duty. It is readily apparent that any discrepancies can be checked instantly and also the prevalent practice of underclassifying a vehicle can be immediately ascertained. This practice is the receiving of the proper tolls by the toll collector from a commercial vehicle and registering the payment of tolls for a similar axle vehicle but of a lower classification. The difference of the toll collected by the toll collector and the toll that is registered is withheld by the collector for his own use. With the present invention, such a fraudulent practice would be obvious.

The invention claimed is:

1. In combination, photographic recording means, counting means including means to indicate a count thereon, vehicle wheel actuated means to actuate said counting means each time the wheels of a vehicle roll thereover, means actuatable by the passage of the front wheels of a vehicle over said vehicle actuated means to actuate said photographic recording means to photographically record both the actuating vehicle and the count indicating means on said counting means, a second counting means, and means to actuate said second counting means each time said means for actuating said photographic recording means is actuated.

2. In combination, photographic recording means, counting means including means to indicate a count thereon, vehicle wheel actuated means to actuate said counting means each time the wheels of a vehicle roll thereover, a second counting means including means to indicate a count thereon, means actuatable by the passage of the front wheels of a vehicle over said vehicle actuated means to actuate said photographic recording means to photographically record both the actuating vehicle and the count indicating means on both of said counting means, and means to actuate said second counting means each time said means for actuating said photographic recording means is actuated.

3. In combination, photographic recording means, counting means including a plurality of counters, each having means thereon to indicate its count, vehicle actuated means, means to actuate at least one of said counters each time said vehicle actuated means is actuated, a manually depressable member adapted to actuate another of said counters each time said depressable member is depressed, and means to actuate said photographic recording means upon actuation of said vehicle actuated means after said depressable member has been depressed to photograph the vehicle actuating said vehicle actuating means and the count indicating means on said counters.

4. In combination, photographic recording means, counting means, including means to indicate a count thereon, vehicle wheel actuated means, means controlled thereby to actuate said counting means each time the wheels of a vehicle roll over said actuated means, said photographic recording means being positioned to photograph said count indicating means and the actuating vehicle, when said photographic recording means is actuated, means actuatable by the passage of the front wheels of a vehicle over said vehicle actuating means to actuate said photographic recording means, a second counting means, and means to actuate said second counting means each time said means for actuating said photographic recording means is actuated.

5. In combination, photographic recording means, counting means, including means to indicate a count thereon, vehicle wheel actuated means, means controlled thereby to actuate said counting means each time the wheels of a vehicle roll over said actuated means, said photographic recording means being positioned to photograph said count indicating means and the actuating vehicle, when said photographic recording means is actuated, means actuatable by the passage of the front wheels of a vehicle over said vehicle actuating means to actuate said photographic recording means, a second counting means, means to actuate said second counting means each time said means for actuating said photographic recording means is actuated, said second counting means being positioned to be photographed each time said photographic recording means is actuated, and manually controlled means to prevent said photographic recording means from being actuated when a vehicle rolls over vehicle actuating means, so that only the first counting means is actuated.

6. In combination, vehicle axle counting means, including means to indicate a count, means to actuate the counting means, including means actuatable by a vehicle at a predetermined location, means to photographically record both the count indicating means and the vehicle at said actuating location, a push button, and means to actuate said recording means after said push button is depressed and the vehicle actuated means is responsive to the presence of the vehicle at said predetermined location.

7. In combination, vehicle axle counting means, including means to indicate a count, means to actuate the counting means, including means actuatable by a vehicle at a predetermined location, means to photographically record both the count indicating means and the vehicle at said actuating location, manual means to prevent the actuation of said recording means so that the presence of the vehicle at said predetermined location will actuate said counting means without actuating said recording means, a second counting means, and means controlled by the actuation of said photographic recording means to actuate said second counting means, and said second counting means being positioned to be photographed each time said photographic recording means is actuated.

8. In combination, vehicle axle counting means, including means to indicate a count, means to actuate the counting means, including means actuatable by a vehcile at a predetermined location, means to photographically record both the count indicating means and the vehicle at said actuating location, manual means to prevent the actuation of said recording means so that the presence of the vehicle at said predetermined location will actuate said counting means without actuating said recording means, a second counting means, means controlled by the actuation of said photographic recording means to actuate said second counting means; and said photographic recording means being adapted to photographically produce a unitary record of said second counting means concurrently with the photographic recording of said first counting means.

References Cited in the file of this patent
UNITED STATES PATENTS

| | | |
|---|---|---|
| 711,935 | Brooks | Oct. 25, 1902 |
| 1,105,484 | Cannon | July 28, 1914 |
| 1,368,798 | Henry | Feb. 15, 1921 |
| 2,313,627 | Cooper | Mar. 9, 1943 |
| 2,340,634 | Wiley | Feb. 1, 1944 |
| 2,589,432 | Rembusch et al. | Mar. 18, 1952 |
| 2,619,402 | McCutcheon | Nov. 25, 1952 |